Figure 1:
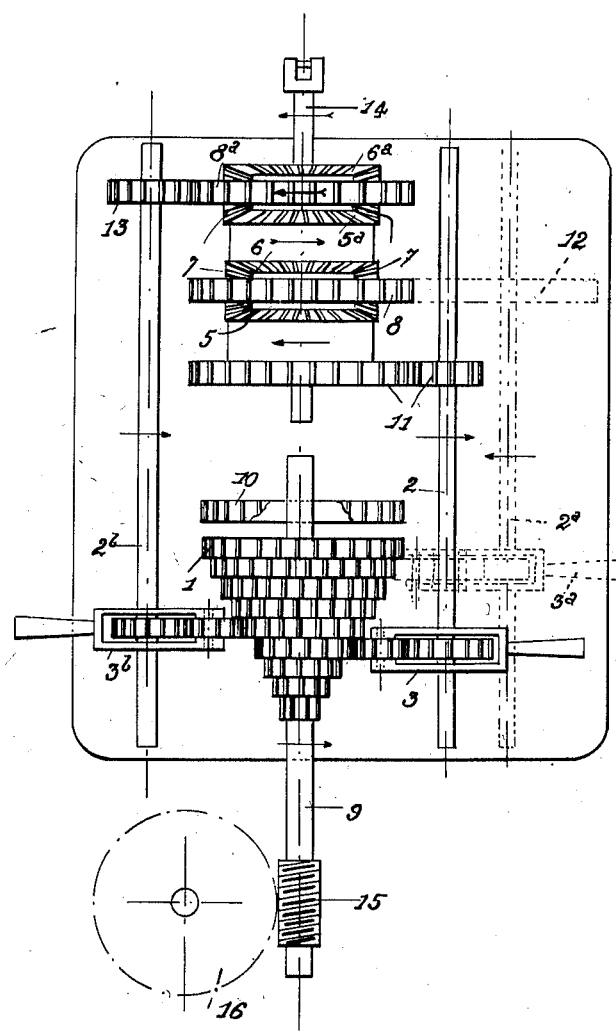

March 13, 1928.  
G. VEBER  
1,662,688  
CHANGE SPEED GEAR BOX OR UNIVERSAL DIVISOR  
Filed July 28, 1926  
4 Sheets-Sheet 1

Inventor:
G. Veber,

March 13, 1928.

G. VEBER 1,662,688

CHANGE SPEED GEAR BOX OR UNIVERSAL DIVISOR

Filed July 28, 1926 4 Sheets-Sheet 3

Inventor,
G. Veber

March 13, 1928.

G. VEBER 1,662,688

CHANGE SPEED GEAR BOX OR UNIVERSAL DIVISOR

Filed July 28, 1926 4 Sheets-Sheet 4

Inventor,
G. Veber.
by Langner, Parry, Card & Langner
Attys

Patented Mar. 13, 1928.

1,662,688

UNITED STATES PATENT OFFICE.

GEORGES VEBER, OF EPINAL, FRANCE, ASSIGNOR TO SOCIÉTÉ DES ETABLISSEMENTS SINGRÜN, OF EPINAL, FRANCE, A CORPORATION OF FRANCE.

CHANGE-SPEED GEAR BOX OR UNIVERSAL DIVISOR.

Application filed July 28, 1926, Serial No. 125,538, and in France July 29, 1925.

The present invention relates to variable speed toothed gearing or devices constructed for the purpose of enabling to be varied, the relationship between the speeds of two shafts of which one drives the other. The invention has more particularly for its object to afford speed-ratios in arithmetical progression, unit by unit, from 1 to N or from 1 to $\frac{1}{N}$. It relates to those of these devices which comprise epicycloidal trains of gearwheels, composing speeds of intermediate shafts rotated by means of cones of stepped gear wheels.

In known change-speed gear boxes of this type, a cone of stepped wheels, held fixed, is surrounded by a driven casing or gear box in which are journaled intermediate shafts upon each of which are arranged sliding pinions intended to be engaged one at a time, with one of the cone wheels, each intermediate shaft is provided externally of the casing with a pinion which meshes with a wheel concentric with the cone. The whole thus affords the conjugation of epicycloidal trains by epicycloidal trains.

From the fact that epicycloidal trains are utilized to obtain the various speeds to be afforded, it becomes necessary, if it be wished to arrange even a fairly limited set of perfectly graduated speeds, to employ a large number of sliding satellite pinions (1 per speed), of driven planetary wheels, and of epicycloidal trains for the addition of the movements of these last wheels.

Further, the law of speeds is complex and it is impossible to obtain in a general manner the relations of speed 1 to N or the divisions 1 to $\frac{1}{N}$ from unit to unit. Moreover, since the sliding pinions are carried round in the rotation of the casing, their drive during working presents a certain amount of difficulty. Lastly, it is necessary to refer to a chart or the like to know which are the sliding gears to be put into engagement when it is wished to obtain a given ratio of speed.

The change-speed gear-box which is the subject of the present invention, is free from these inconveniences. It is applicable in particular as a divisor in machines for cutting gear wheels, either by disc-cutters or by screw-cutters; in this case the rotating cone or cones can be operated by the differential train or trains of gears, the apparatus being reversible.

The annexed drawing represents by way of examples, some forms of construction of the apparatus. In this drawing the same figures of reference designate equivalent parts.

Figure 2:
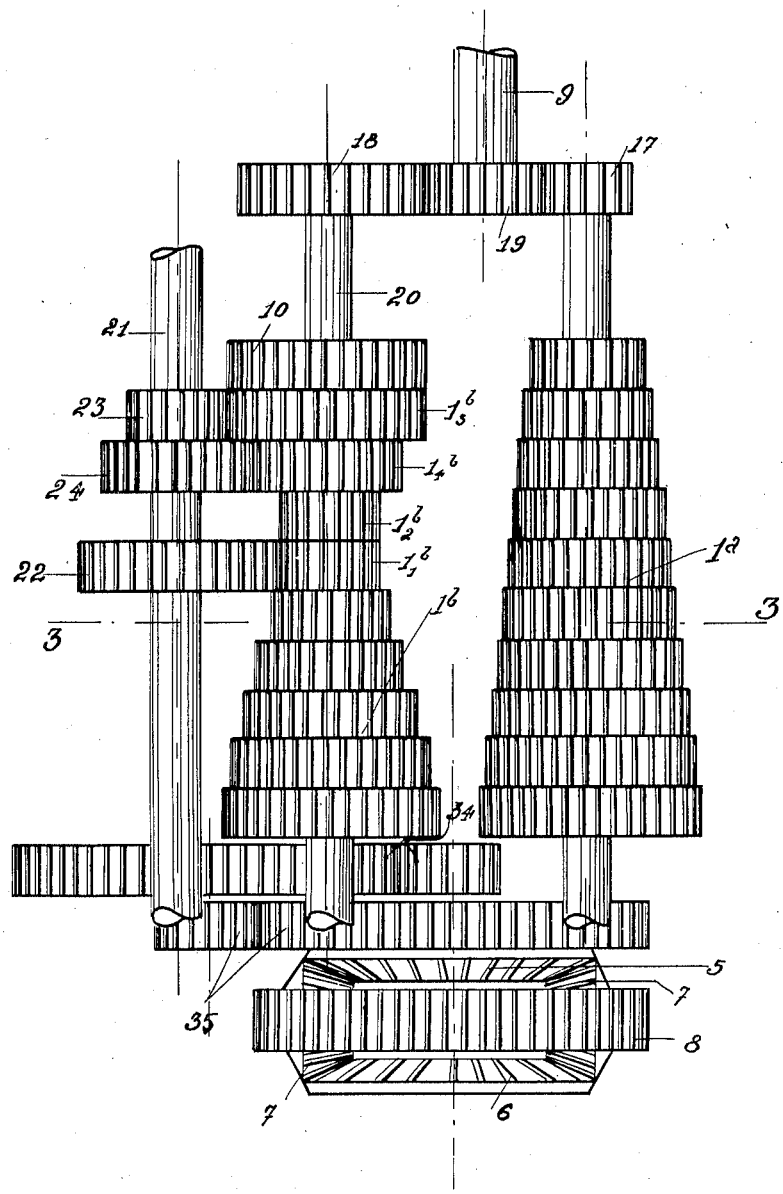
Figure 3:
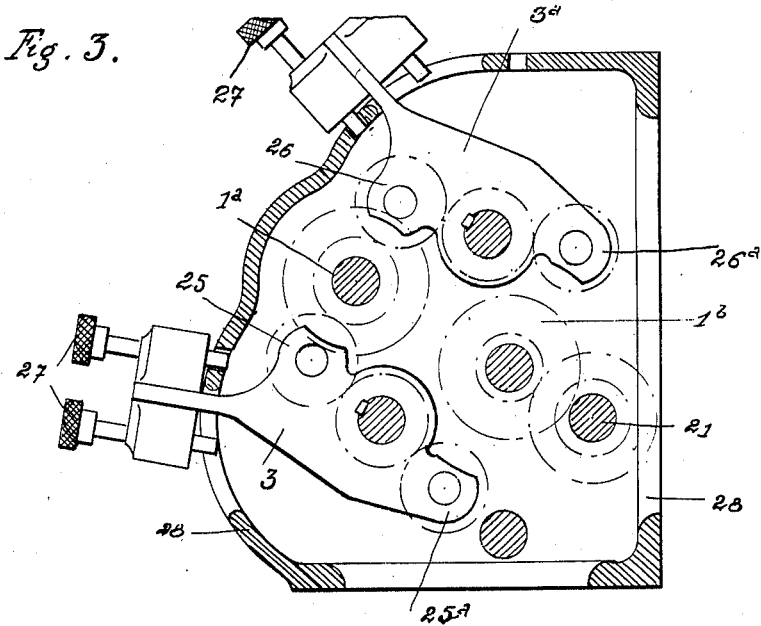
Figure 5:
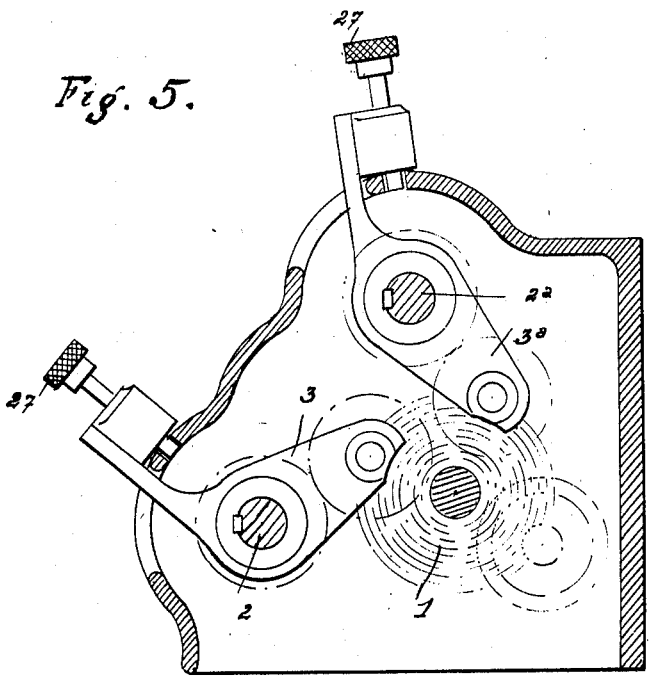
Figure 4:
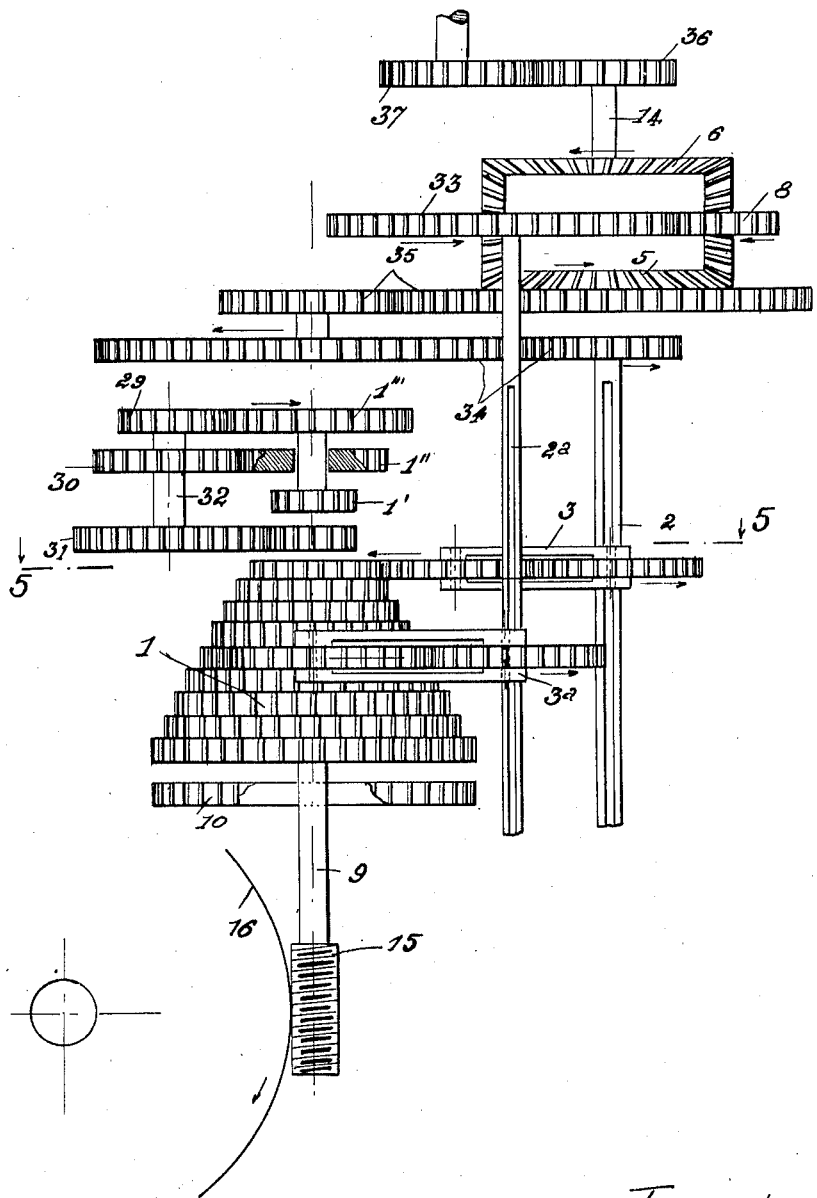

Figure 1 is a diagram in plan of one of these forms. Figure 2 is a similar view of a modification. Figure 3 is a section of Figure 2 on line 3—3. Figure 4 is a diagram in plan view of a second modification. Figure 5 is a corresponding transverse section on line 5—5.

The characteristic feature of the gear box according to this invention is that the stepped cone or cones of gear wheels 1, $1^a$ $1^b$ . . . which are rotatable, are connected with the intermediate shafts 2, $2^a$, $2^b$ . . ., which are fixed in space, by means of displaceable wheel-fitted frames 3, $3^a$, $3^b$ . . . in order that the whole scale of speeds for each of the said shafts can be directly obtained. It is easy thus to obtain for these shafts speeds which follow one another according to the series of whole numbers. The speed of each shaft is immediately known by the position of the corresponding wheel-fitted frame upon the cone or cones; a single one of these wheel-fitted frames is sufficient to obtain all the speeds which any one shaft is to assume. The connecting shafts between cones and epicycloidal trains remaining fixed in space, the sliding wheel-fitted frames can be manipulated conveniently even during working.

Another characteristic of the invention consists in the use for the addition of the speeds, of differential trains of gears or balance-gears in which the driving bevel wheel 5, $5^a$ . . . and the driven bevel wheel 6, $6^a$ . . . are equal to one another, the satellite bevel pinions 7 being in consequence equal to one another.

If, in the trains of gears so formed, the cage or member carrying the satellite pinions 8, 8ª ... remaining fixed, the driving bevel wheel 5, 5ª turns, its rotation is transmitted to the driven bevel wheel 6, 6ª, retaining its value but changing its sign or direction.

If the driven bevel wheel 5, 5ª, being stationary, the cage or member carrying the satellite pinions 8, 8ª, is caused to turn, the driven bevel wheel 6, 6ª, assumes a speed which is in the same direction as that of the said cage or member and is of double extent.

If, during the rotation of the cage or member carrying the satellites 8, 8ª, a rotation in the opposite direction be imparted to the driving bevel wheel the driven bevel wheel 6, 6ª revolves at a speed equal in absolute value, to the sum of the speed of the driving bevel wheel 5, 5ª, and double the speed of the cage or member carrying the satellite pinions 8, 8ª.

These properties enable the speeds of the intermediate shafts of the device to be chosen in such a manner that the speed of the driven shaft can increase, unit by unit, according to the succeeding whole numbers. A constructional arrangement comprising, for example, a cone of $N$ wheels which have increasing diameters, unit by unit, from 1 to $N$, a first displaceable wheel-fitted frame engaging with one of these wheels, communicates to the driving bevel wheel of the train, a speed of which the absolute value can increase according to the sequence of the whole numbers from 1 to $N$. A second displaceable wheel-fitted frame having a multiplying relation of $\frac{N+1}{2}$ controls the member or cage carrying the satellites, which cage transmits consequently to the driven wheel, supplementary speeds varying from $$N+1 \text{ to } (N+1) \times N,$$

according to an arithmetical progression having a constant difference or base $N+1$.

Thus one has at disposal a continuous sequence of speeds varying, unit by unit, from 1 to $((N+1)N+N)$ either from 1 to 195 with two intermediate shafts, for $N=12$ (base 14). One can utilize a new supplementary differential train, mounted in continuance of the first, with a common double loose wheel. The member carrying the satellite pinions of this last train ($8^a$) is operated through a wheel-fitted frame of equal multiplying ratio $\frac{(N+1)^2}{2}$.

There is then arranged a continuous series of speeds proceeding from 1 to $$((N+1)^2 \times N + (N+1)(N+N))$$

either from 1 to 999, with three intermediate shafts, for $N=9$ (base 10). In this case, one of the shafts affords the units, another the tens, the third the hundreds.

In general, the number of speeds which can be obtained is equal to the sum of terms of geometrical progression of which the constant factor or base $(N+1)$ can be selected at will and of which the first term is $N$. The number of these terms is equal to that of the differential trains increased by 1.

According to Figure 1 of the drawings, there are two differential trains or balance-gears thus combined, whilst the modifications shown in Figures 2 and 4 comprise only a single one.

In the first modification represented, the rotary shaft 9 carries the cone 1 composed of nine toothed wheels of which the diameters are in arithmetical progression from 1 to 9. A fixed wheel 10 is arranged in proximity to the largest wheel of the cone 1. Each of the displaceable wheel-fitted frames 3, 3ª, 3ᵇ, can be moved along the corresponding shaft 2, 2ª, 2ᵇ, the pinion mounted on this shaft driving it by an elongated key or feather. The displaceable wheel-fitted frames pivot at the same time so as to be capable of being brought into engagement with the desired wheel of the cone, or with the fixed wheel 10, which corresponds with the stoppage of the shaft concerned. The shaft 2 rotates the driving bevel wheel 5 of a first differential train or balance-gear by the intermediary of the pair of toothed wheels 11. The shaft 2ª rotates by means of the wheel 12, the cage carrying the satellites 8 of this same train. The driven bevel wheel 6 of the latter is fast with the driving bevel wheel 5ª of the following train. The cage carrying the satellites 8ª of this last mentioned train is driven by the spur-wheel 13 keyed on the shaft 2ᵇ. The driven bevel wheel 6ª of the last train is fast with the shaft 14.

The wheel-fitted frames 3, 3ª, 3ᵇ are constituted in such a manner that the cage carrying the satellites 8 of the first train turns in the opposite direction to that of the wheel 5 which is the same as that of the cage carrying the satellite pinions 8ª. The wheels employed in these wheel-fitted frames are chosen in such a way that the multiplying powers of the transmission gears corresponding with each of the shafts 2, 2ª, 2ᵇ are between them as 1, 5 and 50.

In these conditions the speed of the wheel 5 varies from unit to unit up to 9, when the wheel-fitted frame 3 is moved from the smallest wheel of the cone 1 to the largest. The speed of the cage 8 varies by 5 and 5 up to 45 when one moves also the wheel-fitted frame 3ª; as regards the cage 8ª its speed increases by 50 and 50 up to 450 for a similar movement of the wheel-fitted frame 3ᵇ. Since the rotations of the satellite carriers 8 8ª are multiplied by two by the action of the differential or balance-gears, the speed of the driven bevel wheel 6ª increases by 10 and 10 up to 90 when one moves the wheel-fitted frame 3ª as indicated above, the other wheel-fitted frames being at rest. The speed increases by 100 and 100 up to 900 when one acts in the same conditions upon the wheel-fitted frame $3^b$.

By reason of the addition of the speeds further produced by the differential gears, the wheel $6^a$ and its shaft 14 can thus assume a speed varying from 0 to 999, unit by unit. The wheel-fitted frame 3 is that for the units, the frame $3^a$ that for the tens, and the frame $3^b$ that for hundreds. In order to obtain a given relationship of speeds, it is sufficient to write or mark in some way the number which expresses it, the bases of the apparatus being equal to 10.

As has been mentioned above, the apparatus is reversible and can, consequently, become a reducer of speed instead of being a multiplying gear, as previously described. If, instead of providing upon the shaft 14 all the speeds from 1 to 999, there is imparted to this shaft a circular movement and it is turned once round, the cone 1 rotates through a fraction of a turn comprised between 1 and $\frac{1}{999}$ according to the position of the wheel-fitted frames upon the cone. This rotation can be communicated, for example, by means of a screw 15 keyed upon the shaft 9, to the plate 16 of a gear-wheel-cutting machine. The apparatus then enables all wheels to be cut having a number of teeth comprised between 0 and 999 even if this number is first.

The modification of Figures 2 and 3 provides only 400 ratios of different speeds, but with a single differential train or balance-gear and only two sliding wheel-fitted frames, which reduces considerably the number of parts of the apparatus and increases its precision.

To the driving bevel wheel 5 of the differential are imparted speeds which can be varied from 0 to $-19$ and to the cage carrying the satellites 8 are imparted positive speeds capable of being varied as desired by 20 and 20 up to 380. The result is that the driven bevel wheel 6 of the train can assume any speed comprised between 0 and 399. The basis of the apparatus is then equal to 20.

Instead of a single cone of 19 wheels (plus one fixed wheel) which would be cumbersome, there are utilized two cones of ten wheels each, $1^a$ $1^b$. The cone $1^a$ gives the speeds from 0 to 9 by means of the wheel-fitted frame 3 and speeds from 0 to 180 by the wheel-fitted frame $3^a$. The cone $1^b$ gives speeds from 10 to 19 by the wheel-fitted frame 3, and the speeds from 200 to 380 by the wheel-fitted frame $3^a$. The cones $1^a$ and $1^b$ are actuated, each at the speed which suits it, by the wheels 17, 18 and 19, this last being keyed on the shaft 9 which controls the divisor plate.

The cone $1^a$ is in a single piece whilst the cone $1^b$ is divided into four parts including the fixed wheel 10. To the other parts of the cone $1^b$ are imparted different angular speeds. The six lower pinions are fast with the shaft 20 carrying the wheel 18 whilst the wheels $1_2^b$ and $1_3^b$ receive their motion by the intermediary of the shaft 21 and of the wheels $1_1^b$, 22, 23, the wheel $1_4^b$ being on the other hand put in motion by the same shaft 21 by the intermediary of the wheel 24.

The sliding wheel-fitted frames 3 and $3^a$ (Fig. 3) situated on each side of the cones $1^a$ $1^b$ are capable of tilting upon the shafts 2, $2^a$. They are provided, each with two engaging pinions 25, $25^a$ and 26, $26^a$ which are caused to mesh with the wheels of the cones $1^a$ and $1^b$ respectively. These sliding wheel-fitted frames are maintained in the desired position by the engagement of the rods of the latching devices 27 in holes in the casing 28 of the apparatus.

The modification of Figures 4 and 5 gives only speeds varying from 0 to 195, but with a single differential gear, two sliding trains of gears and a single cone of stepped wheels, so that the apparatus become very simple.

The cone 1 comprises 13 wheels (not including the fixed wheel 10). These 13 wheels are grouped in three sections connected together by the pinions 29, 30, 31, fast with the shaft 32. The lower section comprising ten wheels is keyed upon the shaft 9; the wheels $1'$ and $1'''$ are driven simultaneously by the pinion 29 and the wheel $1''$ is separated therefrom by the wheel 30.

The sliding wheel-fitted frame $3^a$ transmits to the cage which carries the satellites 8 of the differential, and by means of the wheel 33, speeds varying from 0 to $+7$, $+14$, $+21$ ... The sliding wheel-fitted frame 3 transmits to the wheel 5, negative speeds 0, $-1$, $-2$, $-3$ ... $-13$ after reduction by the two pairs of spur-wheels 34, 35. The basis of the apparatus is in this case equal to 14.

The movement of the shaft 14 can be transmitted elsewhere by means of a pair of wheels 36—37. If the wheel 37 has a number of teeth half that of the wheel 36, the speeds which its shaft will assume for the various positions of the sliding members upon the cone, will vary by two and two, from 0 to 390, which allows of the possibilities of the apparatus to be extended in a very simple manner by means only of the changing of the wheel 37.

The number of gear wheels in the cone can be further reduced whilst maintaining the power to reverse the direction of one or several intermediate shafts, in such a way as to have a term either subtractive, or additive, in place of a term always additive in the composition of the speeds.

It is evident that the invention is not strictly limited to the ratios of speed indicated or to the shapes and details of construction described and shown, but that it can be carried out with variations. Thus, in particular, in place of employing differential or balance-gears having crown wheels and bevel pinions, spur-gears may be used.

What I claim is:

1. A change speed gear, comprising a frame, a drive member, a stepped wheel gear driven thereby, a number of countershafts journalled in said frame, a tumbler gear slidably mounted upon each of said countershafts and adapted to engage with anyone of the toothed wheels of the stepped wheel gear, a planet gear comprising a number of planet gear units, one of the sun wheels of one of the planet gear units being fast with one of the sun wheels of the next planet gear unit, a driven member fast with one of the sun wheels of one of said planet gear units, a gear driven by one of the countershafts adapted to actuate that one of the sunwheels of the first planet gear unit, which is not fast with the sun wheel of the second planet gear unit, a gear driven by each of the other countershafts and adapted to actuate the planet-pinion carrier of each of the planet gear units.

2. In a change speed gear as claimed in claim 1, the arrangement in which the toothed wheels of the stepped wheel gear are provided with a number of teeth in arithmetical progression from one wheel to the next one, and in which the gear ratio from the first wheel of the tumbler gear slidably mounted upon anyone of the countershafts, to the planet pinion carrier actuated by the same countershaft is a multiple of the half of the number of wheels of the stepped gear plus one, for the purpose described.

3. In a change speed gear as claimed in claim 1, the provision of means for preventing a movement of rotation of any one of the countershafts, after disengagement of the tumbler gear mounted upon the same from the stepped wheel gear.

4. In a change speed gear as claimed in claim 1, the provision, upon the frame, of a toothed wheel with which anyone of the tumbler gears may engage, for the purpose described.

5. In a change speed gear as claimed in claim 1, the provision of a reducing speed gear actuated by one of the wheels of the stepped gear and actuating auxiliary toothed wheels, with which anyone of the tumbler gears may be brought in engagement, for the purpose described.

In testimony whereof I have signed my name to this specification.

GEORGES VEBER.